INVENTOR
GERARD HEPP
BY Fred M Vogel
AGENT

Nov. 4, 1952 G. HEPP 2,617,021
CIRCUIT ARRANGEMENT FOR RECEIVING FREQUENCY MODULATED OSCILLATIONS
Filed Dec. 23, 1947 2 SHEETS—SHEET 2

INVENTOR
GERARD HEPP
BY Fred M Vogel
AGENT

Patented Nov. 4, 1952

2,617,021

UNITED STATES PATENT OFFICE 2,617,021

CIRCUIT ARRANGEMENT FOR RECEIVING FREQUENCY-MODULATED OSCILLATIONS

Gerard Hepp, Eindhoven, Netherlands, assignor to Hartford National Bank and Trust Company, Hartford, Conn., as trustee Application December 23, 1947, Serial No. 793,495
In the Netherlands December 4, 1946

Section 1, Public Law 690, August 8, 1946
Patent expires December 4, 1966

6 Claims. (Cl. 250—20)

The invention relates to circuit-arrangements for receiving frequency-modulated oscillations and it has for its object to provide circuit-arrangements in which the undesired amplitude modulation of these oscillations is made inoperative.

In the conventional circuit-arrangements for receiving frequency-modulated oscillations these oscillations, after being mixed with a locally generated oscillation and, as the case may be, after intermediate-frequency amplification, are supplied to a limiter in which the undesired amplitude modulation is suppressed. Such circuit-arrangements have the disadvantage that not only a separate limiter tube but often also an additional amplifying tube is required since the ratio between the output voltage and the input voltage of a limiter tube is very unfavourable.

These disadvantages are obviated in the circuit-arrangement according to the invention.

According to the invention, in a circuit-arrangement comprising two electric discharge tubes of which the input circuit of the second tube is coupled to the output circuit of the first tube to the input circuit of which the frequency-modulated oscillations are supplied, the frequency-modulated oscillations generated in the output circuit of the second tube are supplied for the purpose aimed at by the invention to an amplitude detector the low-frequency output voltage of which is supplied to the input circuit of any of both tubes whereafter the low-frequency voltage taken from the output circuit of this tube controls the amplification and more particularly the slope of the other tube.

Figures 1, 2, 3:
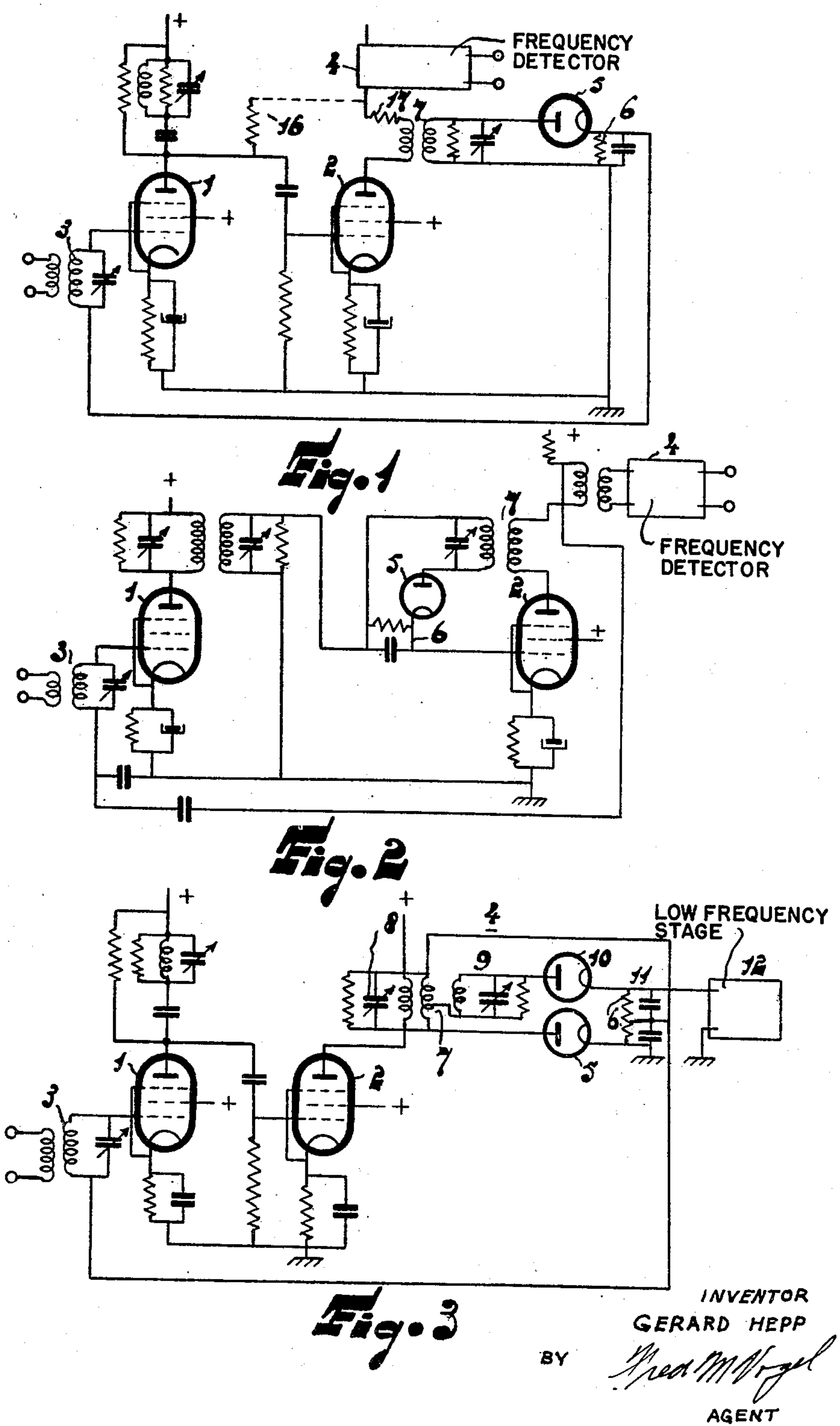
Figure 4:
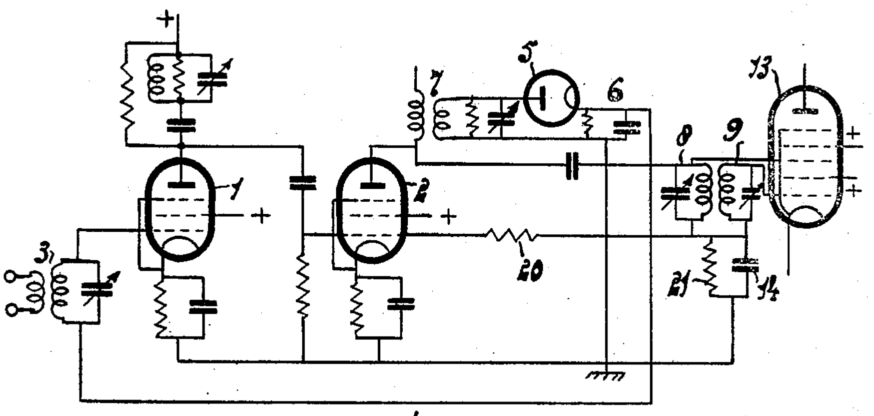
Figure 5:
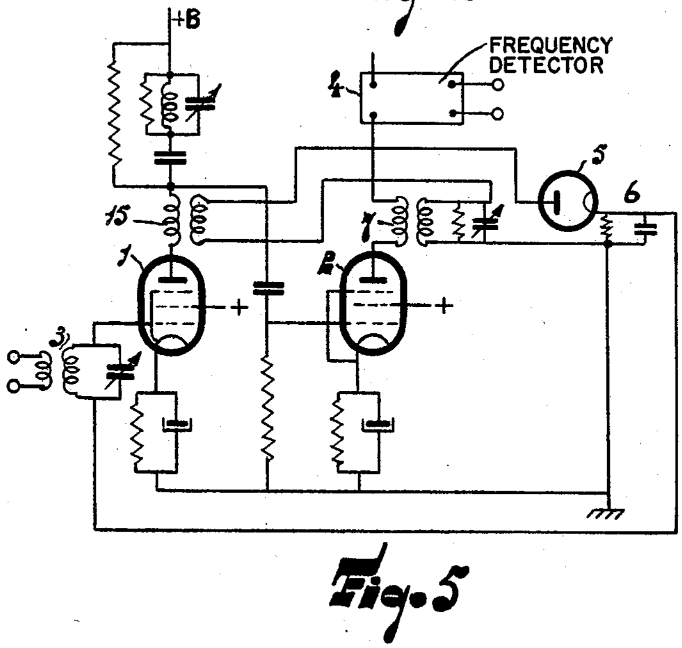

The invention will be explained more fully with reference to the accompanying drawings wherein the various figures represent, by way of example, embodiments thereof. Fig. 1 shows a preferred embodiment of the invention. Fig. 2 shows a further embodiment of the species of the invention shown in Fig. 1. Fig. 3 shows another embodiment of the invention. Fig. 4 shows a further embodiment of the invention. Fig. 5 shows a further embodiment of the species of the invention shown in Fig. 1.

In Fig. 1 of the drawing, 1 and 2 designate two electric discharge tubes which perform, for example, the functions of two intermediate frequency amplifiers connected in cascade of a receiver for frequency-modulated oscillations. The frequency-modulated intermediate-frequency oscillations are supplied, via an input transformer 3, to the input circuit of the tube 1 whilst the output circuit of the tube 1 is coupled to the input circuit of the tube 2, the output circuit of which has a frequency detector 4 of common type coupled to it.

The oscillations supplied to the input transformer 3 exhibit an undesired amplitude modulation; by taking the steps according to the invention, the amplitude modulation of the oscillations to be supplied to the frequency detector 4 may be suppressed to such an extent that it does not cause any trouble. For this purpose the amplitude-modulated oscillations set up in the output circuit of tube 2 are detected with the aid of an amplitude detector 5 whereupon the low-frequency control voltage which is set up across a smoothing filter 6 in the output circuit of the detector 5 and which fluctuates in accordance with the amplitude modulation, is supplied to the input circuit of tube 1, is amplified in this tube and subsequently this amplified low-frequency control voltage controls the amplification, more particularly the slope of the control tube 2. Any undesired amplitude modulation of the oscillations supplied to the detector 5 thus gives rise to an amplified control voltage which counteracts this undesired amplitude modulation.

In the circuit-arrangement according to Fig. 2, the tubes 1 and 2 have interchanged their functions as a regulating voltage amplifier and a control tube respectively. This offers the advantage that the control voltage, which is now supplied to tube 1 and amplified in tube 2, exerts a far greater influence upon the amplification of the tube 1 since the intermediate-frequency oscillations supplied to the grid of this tube 1 have a much smaller amplitude so that also a comparatively smaller control voltage is required to vary the average slope of the control tube by the same account.

With such a circuit-arrangement it is possible to reduce the undesired amplitude modulation frequencies, for example, to 3000c/sec. of the oscillations to be supplied to the frequency detector 4 by a factor 200, which is more than 10 times better than is obtained with a limiter tube of the highest quality. For higher audio-frequencies, in which case fundamentally a smaller reduction factor suffices, the circuit-arrangement may be thus that this reduction factor decreases approximately in inverse proportion to the audio frequency, in which event the circuit-arrangement may be made very stable. Owing to the fact that the amplitude modulation is reduced considerably, it is allowable to construct the frequency detector as a single-phase detector instead of a push-pull detector, one diode being thus economized.

It is also possible, however, to economize one diode without giving up the advantages of a push-pull detector. One example of such a circuit-arrangement is given in Fig. 3. In this circuit-arrangement which is similar to that shown in Fig. 1, the oscillations set up in the output circuit of the tube 2 are supplied, via a coupling transformer 7 similar to that shown in Fig. 1, to the amplitude detector 5 from the output circuit of which the control voltage is taken.

However, together with a tuning condenser 8 the coupling transformer 7 forms at the same time one of the oscillatory circuits of a discriminator network 7—8—9 the frequency-dependent output voltage of which is detected with the aid of a detector 10 and a smoothing filter 11. The circuits 7, 8 and 9 may be so dimensioned that for the central frequency the voltage across the filter 11 is equal to that set up across the filter 6 so that for this frequency the voltage to be supplied to the low-frequency stage is completely independent of the amplitude modulation of the oscillations generated in the output circuit of the tube 2. It is evident that the properties of the push-pull detector are maintained if to the low-frequency stage 12 is supplied a voltage which is equal to the difference between the voltage set up across the smoothing filter 11 and a voltage taken in another manner from the output circuit 6 of the detector 5, for example the low-frequency component of the voltage set up in the output circuit of tube 1.

Various measures will be described hereinafter for the total compensation of the remaining undesired amplitude modulation in the circuit-arrangements according to Fig. 1 or 3.

Fig. 4 illustrates a method according to which the amplification of an electric discharge tube following after tube 2 is controlled by part of the control voltage amplified in tube 1. For this purpose, the oscillations occurring in the output circuit of tube 2 are supplied, for example via a discriminator network 8–9, to a detector frequency changer 13. The intermediate-frequency voltages on the two control grids of this tube exhibit a phase difference which, in first approximation, is proportional to the frequency deviation of the oscillations to be detected and which, for example for the central frequency, is equal to 90°. In the anode circuit to this tube is consequently set up, in addition to high frequency components, a low-frequency voltage the value of which is proportional to the frequency deviation and to the amplitude of the oscillations to be detected and which, furthermore, depends upon the bias voltage of the two control grids. This bias voltage is determined by the low-frequency control voltage divided by a potentiometer 20, 21 and set up in the output circuit of tube 1. A slight increase of the amplitude of the oscillations supplied to the detector frequency changer 13 therefore leads to a proportional increase of the negative bias of the grids of the tube 13 so that in the case of correct dimensioning the low-frequency component of the anode voltage is independent of the said increase in amplitude. For the purpose of suppressing intermediate-frequency oscillations, a condenser 14 is provided which exhibits a slight impedance for the frequency of the intermediate-frequency oscillations and a high impedance for the frequency of the low-frequency control voltage.

A further compensation method which may be used in the circuit-arrangements according to Figs. 1 and 3, is illustrated in Fig. 5 wherein the detector 5 has supplied to it, besides the voltage very slightly modulated in amplitude and supplied via the transformer 7, part of the voltage set up, for example, in the output circuit of tube 1 and exhibiting a comparatively great amplitude modulation. In the circuit-arrangement the secondary of a transformer 15 included in the anode circuit of tube 1 is connected in series with the secondary of the transformer 7 incorporated in the input circuit of the detector 5.

In a variant of this compensation method the voltage set up across the secondary of the transformer 15 is connected, after rectification, in series with the voltage set up across the filter 6. Usually, however, this method is a failure due to the fact that the first-mentioned voltage is too small to be rectified.

A third compensation method, which may also be applied to the circuit-arrangements according to Figs 1 and 3, consists in that the frequency detector 4 has supplied to it, besides the voltage set up in the output circuit of tube 2, part of the voltage set up in the output circuit of tube 1, in such manner that the undesired amplitude modulations of these two voltages neutralize one another. For this purpose, for example, the anode of tube 1 in Fig. 1 is connected via a resistance 16 to the input circuit of the frequency detector 4, the anode of tube 2 being connected to this input circuit via a resistance 17.

The invention is not limited to the examples given above. Thus, the tubes 1 and 2 may perform, for example, the functions of a first-mixing stage and of an intermediate-frequency-amplifier respectively.

Moreover, it is not necessary that the slope of the control tube should be varied by the control voltage. It is, for example, also possible to bring about a control such that, for example, the control grid of the control tube will carry current so that also the amplification of this tube varies.

Although the control voltage set up brings about the suppression of low-frequency amplitude variations of the oscillations set up in the output circuit of tube 2, it generally does not suppress very slow amplitude variations, a separate automatic volume control being necessary for this purpose. For such a control, which may be of any common type and which, if desired, may be combined with any of the circuit-arrangements according to the invention, no protection is applied for.

What I claim is:

1. A circuit arrangement for receiving input signals having a desired frequency modulation component and an undesired amplitude modulation component comprising a first thermionic discharge tube having a cathode, grid and anode, means to apply said signals to the grid-cathode circuit of the said first thermionic discharge tube, a second thermionic discharge tube having a cathode, grid and anode, a cascade connection between said first and second thermionic discharge tubes, a detector for frequency modulated signals, means to couple said frequency modulated detector to the anode-cathode circuit of said second thermionic discharge tube, means to derive a unidirectional voltage proportional to the undesired amplitude modulation component of said desired signals from the anode-cathode circuit of the said second thermionic discharge tube, means to apply said derived unidirectional voltage to the grid of one of said tubes, an impedance element interposed in the anode-cathode circuit of said one tube and having a value at the frequency of said undesired amplitude modulation component to produce across said impedance element an amplified voltage proportional to said undesired amplitude modulation component, and means to apply said amplified voltage in inverse feedback relationship relative to said undesired component to the grid-cathode circuit of the other of said tubes.

2. In a receiver for radio signals having a frequency modulation component and an undesired amplitude modulation component, a circuit arrangement comprising a first thermionic discharge tube having a cathode, grid and anode, first tuned circuit means to apply the signals to the grid-cathode circuit of the said first thermionic discharge tube, a second thermionic discharge tube having a cathode, grid and anode, second tuned circuit means connecting said first and second thermionic discharge tubes in cascade relation, a frequency discriminator, third tuned circuit means to couple said frequency discriminator to the anode-cathode circuit of said second thermionic discharge tube, means to derive a undirectional automatic volume control voltage proportional to the undesired amplitude modulation component of said signals, said latter means comprising a undirectional conductor coupled to the anode-cathode circuit of the said second thermionic discharge tube, means to apply said derived undirectional volage to the grid of one of said tubes, an impedance element interposed in the anode-cathode circuit of said one tube and having a value at the frequency of said undesired amplitude modulation component to produce across said impedance element an amplified voltage proportional to said undesired amplitude modulation component, and means to apply said amplified voltage in inverse feedback relationship relative to said undesired component to the grid-cathode circuit of the other of said tubes.

3. In a receiver for radio signals having a frequency modulation component and an undesired amplitude modulation component, a circuit arrangement comprising a first thermionic discharge tube having a cathode, grid and anode, first circuit means to apply the signals to the grid-cathode circuit of the said first thermionic discharge tube, a second thermionic discharge tube having a cathode, grid and anode, means to connect said first and second thermionic discharge tubes in cascade relation, a frequency discriminator, second circuit means to couple said frequency discriminator to the anode-cathode circuit of said second thermionic discharge tube, means to derive a unidirectional automatic volume control voltage proportional to the undesired amplitude modulation component of said signals, said latter means comprising a undirectional conductor coupled to the anode-cathode circuit of the said second thermionic discharge tube, means to apply said derived unidirectional voltage to the grid of one of said tubes, an impedance element interposed in the anode-cathode circuit of said one tube and having a value at the frequency of said undesired amplitude modulation component to produce across said impedance element an amplified voltage proportional to said undesired amplitude modulation component, and means to apply said amplified voltage in inverse feedback relationship relative to said undesired component to the grid-cathode circuit of the other of said tubes.

4. In a receiver for radio signals having a frequency modulation component and an undesired amplitude modulation component, a circuit arrangement comprising a first thermionic discharge tube having a cathode, grid and anode, first circuit means to apply said signals to the grid-cathode circuit of the said first thermionic discharge tube, a second thermionic discharge tube having a cathode, grid and anode, means to couple said first and second thermionic discharge tube in cascade relation, a frequency discriminator, second circuit means to couple said frequency discriminator to the anode-cathode circuit of said second thermionic discharge tube, means to derive a unidirectional voltage proportional to the undesired amplitude modulation component of said signals, said latter means comprising an amplitude modulation detector inductively coupled to the anode-cathode circuit of the said second thermionic discharge tube, means to apply said derived unidirectional voltage to the grid of one of said tubes, an impedance element interposed in the anode-cathode circuit of said one tube and having a value at the frequency of said undesired amplitude modulation component to produce across said impedance element an amplified voltage proportional to said undesired amplitude modulation component, and means to apply said amplified voltage in inverse feedback relationship relative to said undesired component to the grid-cathode circuit of the other of said tubes.

5. In a receiver for radio signals having a frequency modulation component and an undesired amplitude modulation component, a circuit arrangement comprising a first thermionic discharge tube having a cathode, grid and anode, means to apply said signals to the grid-cathode circuit of the said first thermionic discharge tube, a second thermionic discharge tube having a cathode, grid and anode, means to couple said first and second thermionic discharge tubes in cascade relation, a third thermionic discharge tube having a cathode, anode and two control grids, first and second tuned circuits inductively coupled to each other, means to couple said first tuned oscillatory circuit to the anode-cathode circuit of the said second thermionic discharge tube and to one of the control grids of the said third thermionic discharge tube and to one of the control grids of the said third thermionic discharge tube, a connection of said second tuned oscillatory circuit to the free control grid of the said third thermionic tube, bias means to supply direct current potential to said first and second control grids of the said third thermionic discharge tube, means to derive a unidirectional voltage proportional to the undesired amplitude modulation component of said signals, said latter means comprising a unidirectional conductor coupled to the anode-cathode circuit of the said second thermionic discharge tube, means to apply said derived unidirectional voltage to the grid of one of said tubes, an impedance element interposed in the anode-cathode circuit of said one tube and having a value at the frequency of said undesired amplitude modulation component to produce across said impedance element an amplified voltage proportional to said undesired amplitude modulation component, and means to apply said amplified voltage in inverse feedback relationship relative to said undesired component to the grid-cathode circuit of the other of said tubes.

6. In a receiver for radio signals having a frequency modulation component and an undesired amplitude modulation component, a circuit arrangement comprising a first thermionic discharge tube having a cathode, grid and anode, first tuned circuit means to apply said signals to the grid-cathode circuit of the said first thermionic discharge tube, a second thermionic discharge tube having a cathode, grid and anode, means to couple said first and second thermionic discharge tubes in cascade relation, a frequency discriminator, second tuned circuit means to couple said frequency discriminator to the anode-cathode circuit of said second thermionic discharge tube, means to derive a unidirectional voltage proportional to the undesired amplitude modulation component of said signals, said latter means comprising a unidirectional conductor inductively coupled to the anode-cathode circuits of the said first and second thermionic discharge tubes, means to apply said derived unidirectional voltage to the grid of one of said tubes, an impedance element interposed in the anode cathode circuit of said one tube having a value at the frequency of said undesired amplitude modulation component to produce across said impedance element an amplified voltage proportional to said undesired amplitude modulation component, and means to apply said amplified voltage in inverse feedback relationship relative to said undesired component to the grid-cathode circuit of the other of said tubes.

GERARD HEPP.

REFERENCES CITED

The following references are of record in the file of this patent:

UNITED STATES PATENTS

| Number | Name | Date |
|---|---|---|
| 1,978,182 | Wilhelm | Oct. 23, 1934 |
| 2,251,382 | Sziklai | Aug. 5, 1941 |
| 2,253,338 | Lewis | Aug. 19, 1941 |
| 2,279,058 | Reid | Apr. 7, 1942 |
| 2,416,911 | Crosby | Mar. 4, 1947 |
| 2,422,087 | Everett | June 10, 1947 |
| 2,472,301 | Koch | June 7, 1949 |